United States Patent [19]

Saito et al.

[11] Patent Number: 4,633,328

[45] Date of Patent: Dec. 30, 1986

[54] PICTURE SCANNING AND RECORDING METHOD

[75] Inventors: Isao Saito, Shiga; Noriyuki Shimano, Kyoto, both of Japan

[73] Assignee: Dainippon Screen Mfg. Co., Ltd., Kyoto, Japan

[21] Appl. No.: 716,679

[22] Filed: Mar. 27, 1985

[30] Foreign Application Priority Data

Jun. 29, 1984 [JP]  Japan .................................. 59-132987

[51] Int. Cl.$^4$ ........................ H04N 1/21; H04N 1/23; H04N 1/40
[52] U.S. Cl. ................................... 358/296; 358/298; 358/302; 358/280
[58] Field of Search ............... 358/296, 298, 299, 302, 358/75, 280

[56] References Cited

U.S. PATENT DOCUMENTS 4,496,989  1/1985  Hirosawa ........................... 358/296

Primary Examiner—E. A. Goldberg
Assistant Examiner—Linda M. Peco
Attorney, Agent, or Firm—Zarley, McKee, Thomte, Voorhees & Sease

[57] ABSTRACT

The picture scanning and recording method of this invention permits the simplification of the manner of designation and input for the processing of picture pattern regions and line picture regions and the simplification of the processing circuit. The original picture is classified into plural types of regions, e.g., picture pattern regions, border tint regions, line picture regions, line picture tint regions or into a plurality of picture pattern regions of the same type. The preference of overlapped areas of the thus-classified regions are ranked. Based on such ranking, a picture image signal corresponding to the region having the highest ranking is selected in each of such overlapped areas.

8 Claims, 13 Drawing Figures

FIG. 8b
| IN | | | OUT | |
|---|---|---|---|---|
| A1 | B1 | P>L | A3 | B3 |
| L | L | X | L | L |
| L | H | X | L | H |
| H | L | X | H | L |
| H | H | H | H | L |
| H | H | L | L | H |
FIG. 9
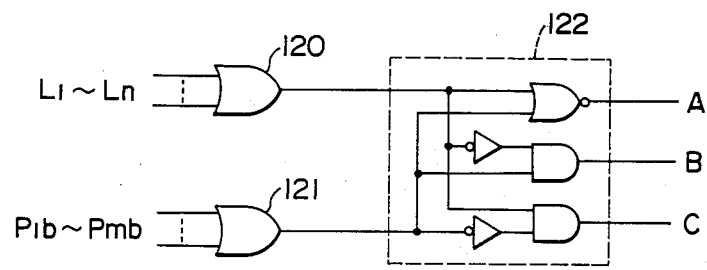
FIG. 10
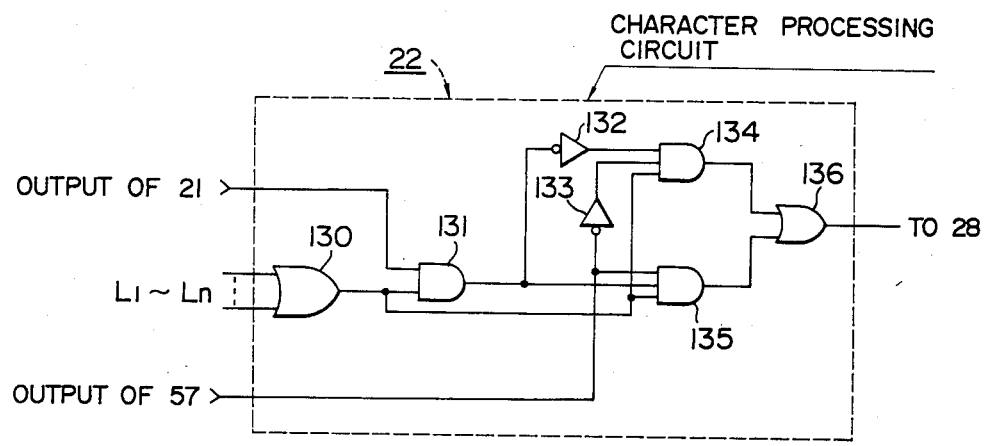

PICTURE SCANNING AND RECORDING METHOD

BACKGROUND OF INVENTION

This invention relates to a method for electronically reproducing an original picture for the fabrication of a printing plate by exposing the original picture and recording its reproduction on the basis of picture signals obtained by photoelectronic scanning of the original picture, in which where the original picture contains picture pattern regions of continuous tone ranging from a high density to a low density in combination with line picture regions such as character regions, picture pattern regions having gradation are output as halftone picture images and on the other hand, line picture regions are output as high-resolution line picture images faithful to the line picture regions in the original picture or if necessary, as halftone images having the same percentage of dot areas, namely, as tint images.

Coupled with popularization of the color photomechanical process in recent years, there is a standing desire for an improvement to the productivity by plate-making color scanners in order to reproduce a number of color images efficiently as color-separated halftone images.

In a final image to be output generally, there are picture pattern images having continuous gradation in combination with line picture images such as characters and/or graphics.

Plate-making color scanners, which are generally called direct scanners and are adapted to perform color separation and at the same time to record reproduced images as halftone images, are accompanied by such a problem that the resolution of areas containing line pictures is deteriorated when fabricating color-separated plates with an original picture for a complete block copy in which original line pictures such as characters, graphics and/or line drawings and original picture patterns having continuous gradation such as color pictures and/or picture patterns have been laid out in a suitable pattern, because the line pictures are also reproduced as halftone patterns.

The present applicant has already filed an application under Japanese Patent Application No. 100236/1983 on a method in which the above-mentioned problem has been solved, and when color-separating a laid-out original picture for a complete block copy with line picture regions such as characters and/or graphics mixed with picture pattern regions, the picture pattern regions and line picture regions are recorded in a single scanning step as color-separated halftone images and reproduced high-resolution line picture images faithful to the original respectively.

SUMMARY OF THE INVENTION

An object of this invention is to achieve the simplification of the manner of designation and input for the processing of picture pattern regions and line picture regions and the simplification of the processing circuit by developing the above-described prior invention further, in other words, by classifying with a small coordinate memory capacity the original picture into plural types of regions, e.g., picture pattern regions, border tint regions, line picture regions, line picture tint regions (in the present specification, the term "border tint" means a halftone pattern of a constant percentage of dot areas recorded corresponding to a border region established along each picture pattern region while the term "line picture tint" means a halftone pattern of a constant percentage of dot areas recorded at a region other than the line sections of line picture images and picture pattern images) or classifying a plurality of picture pattern regions of the same type, and by ranking the preference of overlapped areas of the thus-classified regions.

In one aspect of this invention, there is thus provided a picture scanning and recording method including photoelectrically scanning an original picture, which contains picture patterns of continuous tone in combination with line pictures such as characters or graphics, providing two types of image-detecting photoelectric means in order to record reproduced halftone images for the picture patterns and reproduced line picture images of high resolution for the line pictures respectively, and outputting two types of picture signals to the recording side, which comprises:

designating in advance, in the original picture, picture pattern regions to be reproduced as the halftone images, line picture regions to be reproduced as the line picture images and border regions surrounding the respective picture pattern regions respectively with the coordinate values of representative points in the respective regions; setting in advance line picture tint data and border tint data, which are required to record desired tint patterns corresponding respectively to the line picture regions and border regions, for the line picture regions and border regions respectively; upon photoelectrically scanning the original picture, selecting picture signals corresponding to the scanned regions on the basis of the coordinate values of each scanning point and the coordinate values of the representative points in the respective regions, and outputting the thus-selected picture signals to the recording side; and at the same time, at an area where two or more of the designated picture regions are overlapped, selecting picture signals having higher preference on the basis of a preset order of preference.

The method of this invention can bring about the following advantageous effects:

(1) The designation of the regions may be effected by a region-designating input switch. The designation of coordinate values for each region can be made at two diagonal vertexes of a rectangle. Therefore, the operation of these designations is easy.

(2) Since ranking in preference has in advance been made between the border regions surrounding the picture pattern regions and the line picture regions, the operation for designating the ranking in preference of the regions is simple.

(3) It is possible to establish separate ranking in preference between the border regions surrounding the picture pattern regions and the line picture regions. It is thus easy to designate the ranking in preference among the regions.

(4) If the preference of the picture pattern regions, border regions and line picture regions are determined beforehand, the operation to designate the ranking in preference of these regions can be performed when laying out the original picture.

(5) The setting of the regions can be achieved with a significantly smaller storage capacity by using two one-dimensional memories instead of storing them two-dimensionally in a two-dimensional memory.

(6) Outputs corresponding to picture pattern images can be automatically obtained for regions not subjected to the designation, thereby simplifying the input operation of the original picture.

(7) If laid-out halftone picture pattern regions are input supposing that the block copy is a line picture region in its entirety, regions other than those designated as picture pattern regions are automatically processed as line picture regions. Thus, the input operation of the regions can be very simplified. This function materializes not only the simplification of the input operation but also a complex layout processing with a smaller memory capacity.

(8) Since the tint data can be read out in accordance with preference-ranking signals for overlapped areas between or among regions of the same type, different tint laying is feasible.

BRIEF DESCRIPTION OF THE DRAWINGS

The above and other objects, features and advantages of this invention will become apparent from the following description and the appended claims, taken in conjunction with the accompanying drawings, in which:

FIG. 9 is a circuit diagram of a selector control circuit according to one embodiment;

FIG. 10 is a circuit diagram of a character processing circuit according to one embodiment;

DESCRIPTION OF THE PREFERRED EMBODIMENTS

Figure 1:
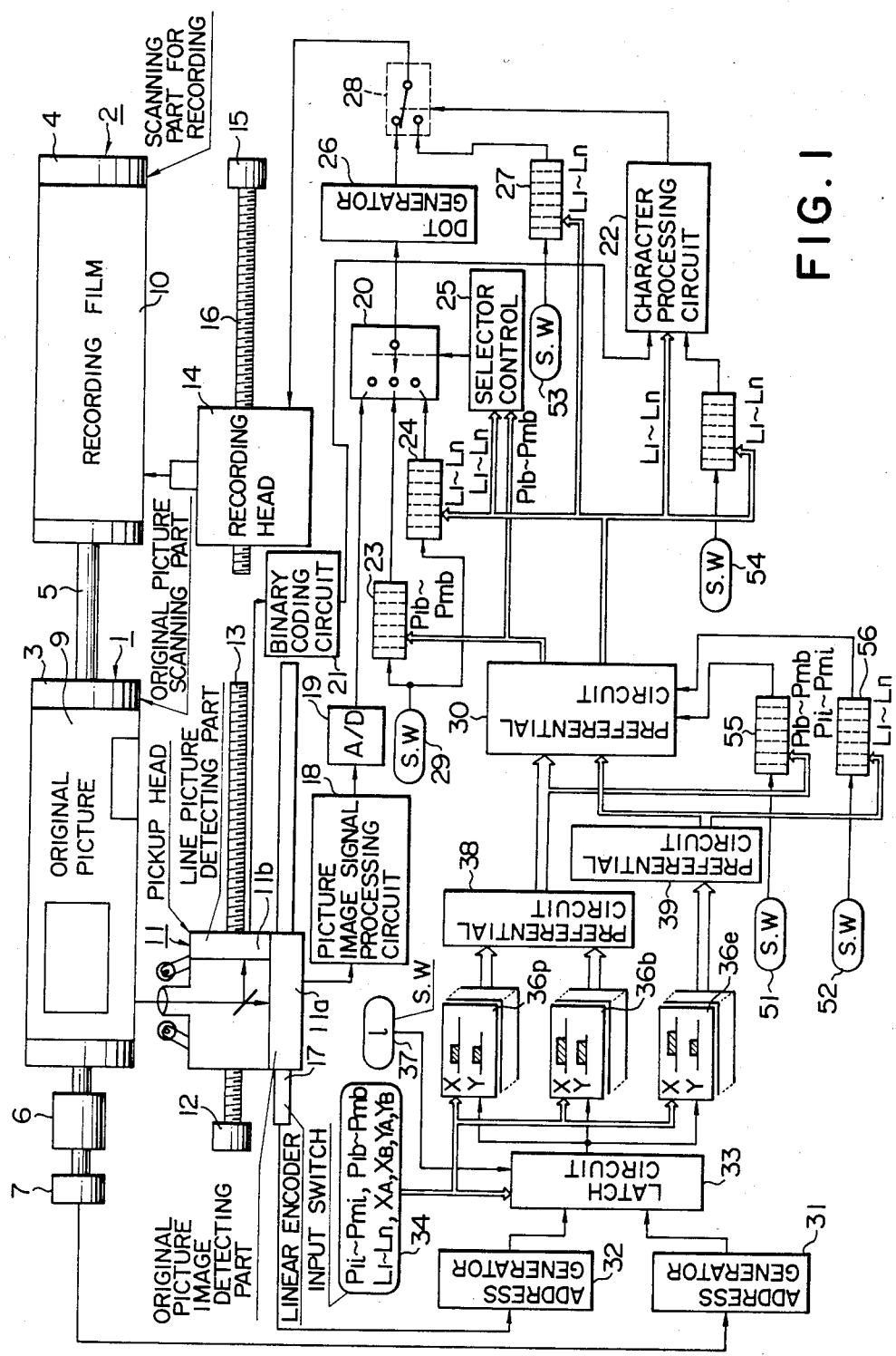
FIG. 1 is a block diagram of one example of a picture scanning and recording system which is suitable for use in the practice of the method of this invention.

Referring first to FIG. 1, an original picture scanning part 1, an original picture cylinder 3 of a scanning part 2 for recording and a recording cylinder 4 are all mounted on a drive shaft 5. They are rotated as unitary members by a motor 6.

The rotation of both of the cylinders 3, 4 are measured by a rotary encoder 7 provided coaxially with the drive shaft 5. The rotary encoder 7 generates a single-turn pulse signal, in which one pulse is produced at a predetermined reference point upon each full rotation, and a phase pulse signal in which pulses are produced respectively at predetermined rotary angles so as to generate a series of pulses during each single rotation.

An original picture 9 is wrapped on the original picture cylinder 3, whereas a recording film 10 is wrapped as a photosensitive material on the recording cylinder 4.

The original picture 9 is photoelectrically scanned by a pick-up head 11, which is moved along the axis of the original cylinder 3 by a motor 12 via a feed screw 13.

Similarly, the recording film 10 is also scanned with an exposing light beam radiated from a recording head 14, which is moved along the axis of the recording cylinder 14 by a motor 15 via a feed screw 16. The moving speed and timing of the recording head 14 is kept in synchronization with those of the pick-up head 11.

The position of the pick-up head 11 in its moving direction (hereinafter called "the sub-scanning direction") is determined by a linear encoder 17 provided in parallel with the feed screw 13. This linear encoder 17 outputs signals pertaining to sub-scanning positions.

The pick-up head 11 is equipped with a halftone picture pattern image detecting part 11a, which outputs color-separated picture signals obtained by color-separating the picture pattern of each picture pattern region containing color picture patterns or the like into three colors of red (R), green (G) and blue (B) and sharpness signals for emphasizing contours, and a line picture detecting part 11b adapted to output line picture image signals corresponding to line picture regions composed of characters, line drawings and/or the like.

Color-separated signals, which have been output from the halftone picture pattern image detecting part 11a, are subjected to picture image signal processing such as color correction, gradation correction and the like, and are then fed to a picture image signal processing circuit 18 where they are converted to picture image signals corresponding respectively to one set of printing ink colors, for example, Y(yellow), M(magenta), C(cyan) and K(black).

Signals output from the picture image signal processing circuit 18 are delivered to an A/D (analog/digital) converter 19, at which they are converted to corresponding digital picture image signals which are in turn sent to an input channel A of a data selector 20.

Line image signals output from the line picture image detecting part 11b are fed, by way of an amplifier adapted to amplify the signals suitably depending on the difference in density between the line picture section and the background section and a comparator capable of discriminating the level difference between the line pattern section and the background section, to a binary coding circuit 21 where the input line image signals are converted to corresponding binary codes.

Signals output from the binary coding circuit 21 are signals of binary levels, which are represented by logic "1" or "0" or level "H" or "L". These signals are fed to a character processing circuit 22.

To an input channel B of the data selector 20, border tint data are fed from a border tint data latch circuit 23. On the other hand, line image tint data are input from a line image tint data latch circuit 24 to an input channel C of the data selector 20.

The data selector 20 is fed with a channel selector signal from a selector control circuit 25 so that either one of the channels A–C is selected. The data selector 20 then sends a signal, which is to be input to the thus-selected channel, to a dot generator 26.

The dot generator 26 outputs, in accordance with a digital value corresponding to the input density value, a signal for recording dots of a desired dot area percentage. When the signal is fed to the recording head 14 by way of a selector 28, the recording head 14 records a halftone picture pattern on the recording film 10.

When this halftone picture pattern is modulated by significantly-varying signals such as color-separated signals, a halftone dot picture pattern is recorded. When modulated by a value always of a constant value such as border tint data or line picture tint data, a tint pattern which is a halftone pattern of a constant dot area percentage is recorded.

Outputs of the dot generator 26 are selectively changed to or from signals output from an ON-OFF signal generator 27 for line picture beams by means of the selector 28.

Signals output from the ON-OFF signal generator 27 for line picture beams are binary signals "1" or "0" which turns on (exposure) or off (non-exposure) the exposing light beam of the recording head 14. These signals and output signals of the dot generator 26 are fed to the recording head 14 by alternately switching the selector 28 in accordance with signals output from the character processing circuit 22.

The character processing circuit 22 controls signals (for example, character signals), output from the binary coding circuit 21, in accordance with region signals L1, L2 . . . , Ln which decide whether they are recorded or not.

When recording characters, the corresponding region signal L is "1". Character signals pass the character processing circuit 22 as they are, and control the switching of the selector 28.

These characters are recorded for example in the following manner. Each character background section is recorded using tint data, which is an input to the channel C selected by the data selector 20 when the output of the binary coding circuit 21 is "0", as a background pattern. When the output of the binary coding circuit 21 is "1" on the other hand, each character section is recorded as a black character or a reversed character when the signal output from the ON-OFF signal generator 27 for line picture beam is "1" or "0".

When the output data of the binary coding circuit 21 is reversed at the character processing circuit 22 in accordance with data from a latch circuit 57 for character processing data, the character background section and the character section can be recorded respectively as a black or white background and a tint in accordance with the output from the ON-OFF signal generator 27 for line picture beam.

Here, tint data of the latch circuit 24 for line picture tint data are used as the character background. These tint data are stored at a plurality of registers in order to record tints of different area percentages. As these tint data which are stored in the respective registers, are selected data on area percentages to be recorded in scanning regions which correspond respectively to scanned regions of the intended character on the original picture.

On the other hand, the border tint data latch circuit 23 is also equipped with a plurality of registers, in which a plurality of border tint data of different area percentages are stored. Similar to the line picture tint data, these respective border tint data are selected in accordance with scanned regions on the original picture.

The border tint data and line picture tint data are input in advance as data corresponding to the values of respective dot area percentages through a tint input switch 29 and are stored in their corresponding registers. Instead of the dot area percentage, the dot pitch may also be varied.

Commands are given via a preferential circuit 38 between picture pattern region and border region, a preferential circuit 39 between line picture regions and a preferential circuit 30 among picture pattern region, border region and line picture region to determine the selection of each of the registers of the border tint data latch 23 and line picture tint data latch circuit 24 as well as the selection of the data selector 20 through the selector control circuit 25, the selection of the ON or OFF of the exposing beam by the ON-OFF signal generator 27 for line picture beam, and whether characters from the character processing circuit 22 are recorded or not.

On the other hand, each signal output from the rotary encoder 7 is input to a y-address generator 31 which pertains to the main scanning direction (i.e., the direction of rotation of the cylinder). This y-address generator 31 produces a y-address signal corresponding to the absolute coordinate value of the scanning point which is determined in the main scanning direction (hereinafter called "y-direction") by considering the point of generation of the single-turn pulse as an origin.

Each signal output from the linear encoder 17 is input to an x-address generator, which generates an x-address signal corresponding to the absolute coordinate value of the scanning point of the pick-up head 11 in the sub-scanning direction (hereinafter called "x-direction"), which scanning point is measured by the linear encoder 17.

Both address generators 31, 32 produce x-address signals and y-address signals of the absolute coordinate values of scanning points of the pick-up head 11 even when the continuous scanning is stopped and the original picture cylinder 3 is manually turned in the y-direction or the pick-up head 11 is manually shifted in the x-direction, to say nothing of the period during which the original picture 9 for block copy is continuously scanned.

Figure 11:
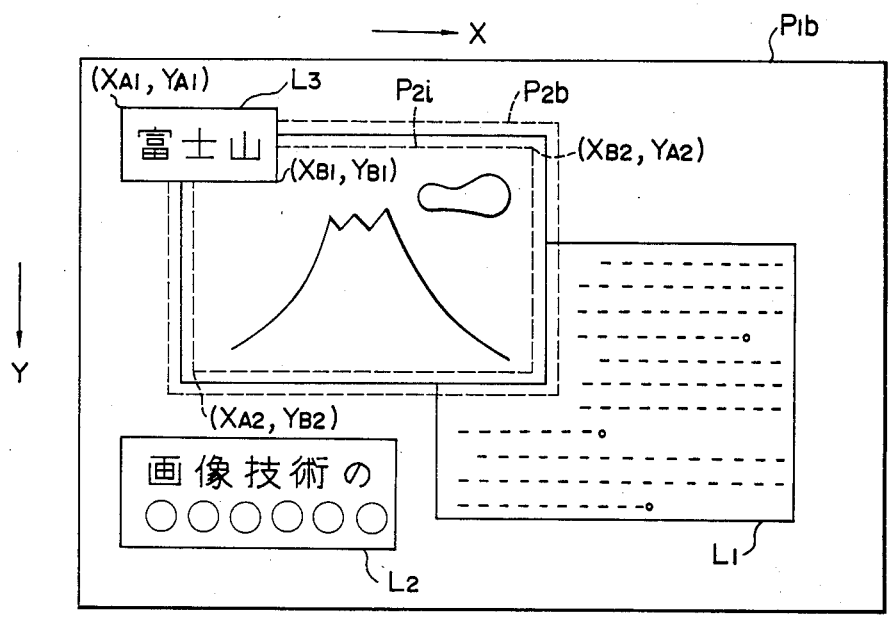
FIG. 11 illustrates one example of an original picture for a block copy.

FIG. 11 illustrates by way of example the arrangement of an original picture 9 for block copy, which is wrapped on the original picture cylinder 3.

A region $P_{1b}$ constitutes a tint region when the entire area of the original picture 9 is handled as a border tint region of a certain dot area percentage and in practice, a region number $P_{1i}$ corresponding to the leading edge of the original picture 9 is not designated as a picture pattern region.

$L_1$, $L_2$ and $L_3$ designate line picture regions, while $P_{2i}$ and $P_{2b}$ indicate a picture pattern region and a border tint region respectively. Taking the line picture region $L_3$ by way of example, its upper left vertex is represented by coordinate values $(X_{A1}, Y_{A1})$ and its lower right vertex is expressed by coordinate values $(X_{B1}, Y_{B1})$. Since the upper left corner of the picture pattern region $P_{2i}$ is covered by the upper left corner region $L_3$ of the original picture 9 and does thus not appear, the coordinate values of its upper right vertex $(X_{B2}, Y_{A2})$ and its lower left vertex $(X_{A2}, Y_{B2})$ are input.

By manually moving the original picture cylinder 3, on which the above-arranged original picture 9 for block copy is wrapped, in the direction of its rotation (i.e., in the y-direction) and shifting the pick-up head 11 in the sub-scanning direction (the x-direction), the specific coordinate values of desired points on the original picture 9 [for example, the coordinate values $(X_B, Y_A)$ of the upper right vertex and the coordinate values $(X_A, Y_B)$ of the lower left vertex of the rectangle in the picture pattern region $P_{2i}$ of FIG. 11]are input in a latch circuit 33 for coordinate values which designate regions.

The details of the latch circuit 33 for coordinate values, which designate regions, will be described herein. Its subsequent block circuits 36p, 36b, 36l, 38, 39, 30, 25, 22 will also be described in detail herein.

A region designation input switch 34 selects region numbers $P_{1i}$–$P_{mi}$ for picture pattern regions, region numbers $P_{1b}$–$P_{mb}$ for border tint regions and region numbers $L_1$-$L_n$ for line picture regions and line picture tint regions, whereby to designate the coordinate values $(X_A)$, $(X_B)$, $(Y_A)$, $(Y_B)$ of the four vertexes of each rectangular region.

Depending on a region designated by the region designation input switch 34, either one of the picture pattern region signal part 36p, border tint region signal part 36b and line picture tint region signal part 36l is selected. Into the thus-selected signal part, a signal "1" is written respectively between XA-XB and between XA-YB in accordance with coordinate values input to the latch circuit 33 for coordinate values.

Each output of the region designation input switch 34 selects one of the registers $P_{1b}$-$P_{mb}$ of the border tint data latch circuit 23, through which tint data is input from the tint input switch 29.

In the same manner, required data are in advance input respectively from the input switches 29,53,51,52,54 to their corresponding tint data latch circuit 24, ON-OFF signal generator 27 for line picture beam, latch circuit 55 for preferential data on picture pattern regions and border tint regions, latch circuit 56 for preferential data on line picture regions and line picture tint regions, and latch circuit 57 for character processing data.

A border width input switch 37 inputs, in association with the region designation input switch 34, a border width data (l) to the latch circuit 33 for coordinate values which designate regions.

Based on the coordinate values (X,Y) under scanning, region signals ($P_{1i}$-$P_{in}$, $P_{1i}$, $P_{1b}$, $L_1$-$L_n$) are output as "1" from the picture pattern region signal part 36p, border tint signal part 36b, and line picture region signal part 36.

When certain regions are overlapped, the preferential circuit 38 between picture pattern region and border region outputs, with respect to overlapped areas, "1" only for the region signal having the highest ranking of the ranking of preference ($P_{mi}$>$P_{mb}$...>$P_{2i}$>$P_{2b}$>$P_{1i}$>$P_{1b}$) and "0" for the remaining region signals.

Similarly, when certain regions are overlapped, the preferential circuit 39 between line picture regions outputs, with respect to overlapped areas, "1" for the region signal having the highest ranking of the ranking of preference (Ln>...>L2>L1) and "0" for the remaining region signals.

Then, the preferential circuit 30 among picture pattern region, border region and line picture region determines the ranking of preference on the basis of data from a latch circuit 55 for preferential data on picture pattern regions and border regions and a latch circuit 56 for preferential data on line picture regions and then outputs "1" only for the region signal having the highest preference ranking.

The picture pattern region signals ($P_{1i}$-$P_{mi}$) are however not output here, because it is only necessary for the data selector 20 to select the input channel A automatically when both of the border region signal and line picture region signal become "0".

Therefore, all the other region signals output "0" when recording the picture pattern regions.

The selector control circuit 25 selects the input channel A when the data selector 20 is at a picture pattern region, the input channel B when it is at a border region, and the input channel C when it is at a line picture region.

In the exemplary original picture 9 for block copy illustrated in FIG. 11, the regions may be arranged as $L_3$>$P_{2i}$>$P_{2b}$>$L_i$>$P_{1b}$ and $L_2$>$P_{1b}$ when arranged in the order of the ranking of their preference.

Figure 2:
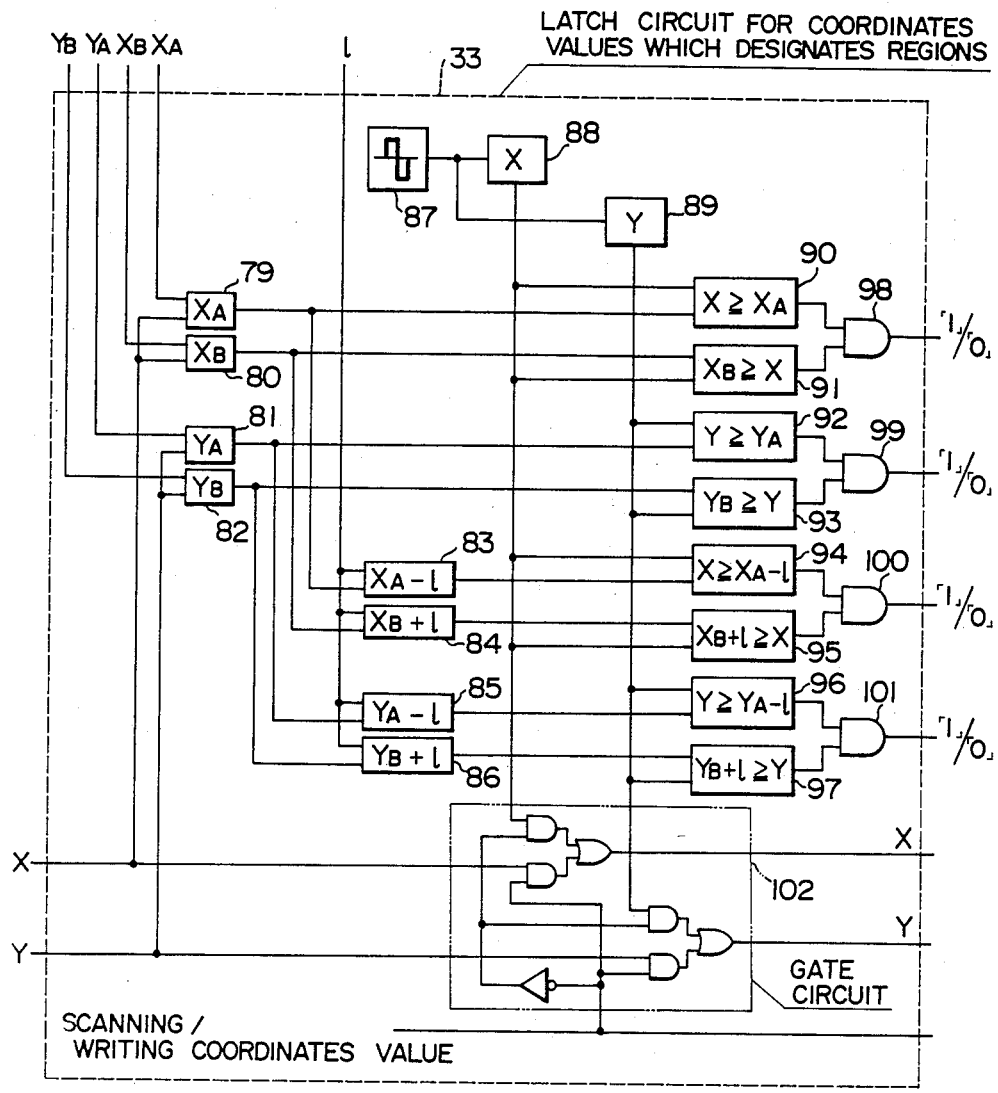
FIG. 2 is a block diagram of one embodiment of a latch circuit for coordinate values designating regions.

FIG. 2 shows one example of the latch circuit 33 for coordinate values which designate regions.

The coordinate values (X, Y) are produced by latching the coordinate data $(X_A)$, $(X_B)$, $(Y_A)$, $(Y_B)$ at the coordinate data latch circuits 79-82 as mentioned above and by feeding pulses from an oscillator 87 to counters 88, 89. At comparators 90, 91, the coordinate values $(X_A)$, $(X_B)$ are compared and the logic product of the outputs from the comparators 90, 91 is determined by an AND gate 98. The output of the AND gate 98 is "1" from $X_A$ to $X_B$ along the x-axis. In the same manner, the output of an AND gate 99 is "1" from $Y_A$ to $Y_B$ owing to comparators 92, 93 and the AND gate 99.

Operations are performed on the border width data (l) and the coordinate data $(X_A)$, $(X_B)$, $(Y_A)$, $(Y_B)$ to latch the data $(X_{A-l})$, $(X_{B+l})$, $(Y_{A-l})$, $(Y_{B+l})$ respectively in the coordinate data latches 83-86.

As mentioned above, the output of an AND gate "100" is "1" from $(X_{A-l})$ to $(X_{B+l})$ owing to comparators 94, 95 and AND gate 100. By comparators 96, 97 and AND gate 101, the output of the AND gate 101 is "1" from $(Y_{A-l})$ to $(Y_{B+l})$.

A gate circuit 102 feeds the coordinate values (X, Y) of momentarily-changing scanning points to the subsequent circuit while causing the pick-up head 11 to scan by the motors 6, 11. When writing coordinate values by the above-mentioned manual operation, the outputs of the counters 88, 89 are fed as the coordinate values (X, Y) to the subsequent circuit.

Figure 3:
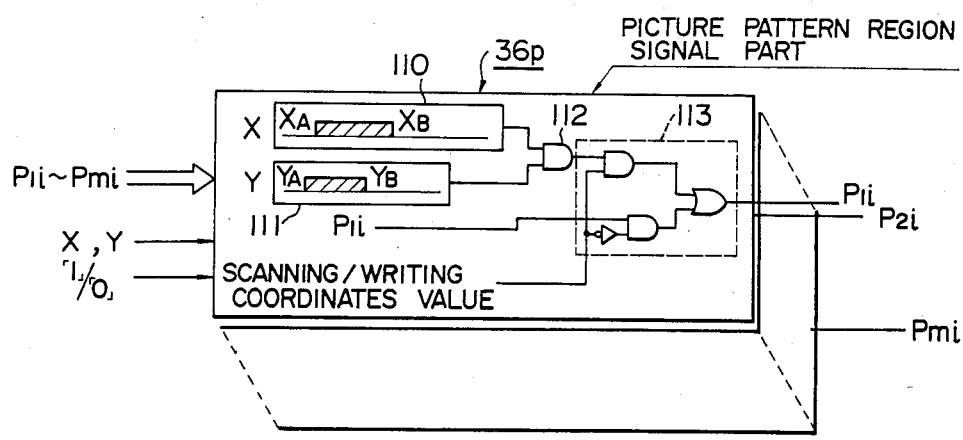
FIGS. 3, 4 and 5 are respectively block diagrams the principles of region signal parts according to different embodiments.
Figure 4:
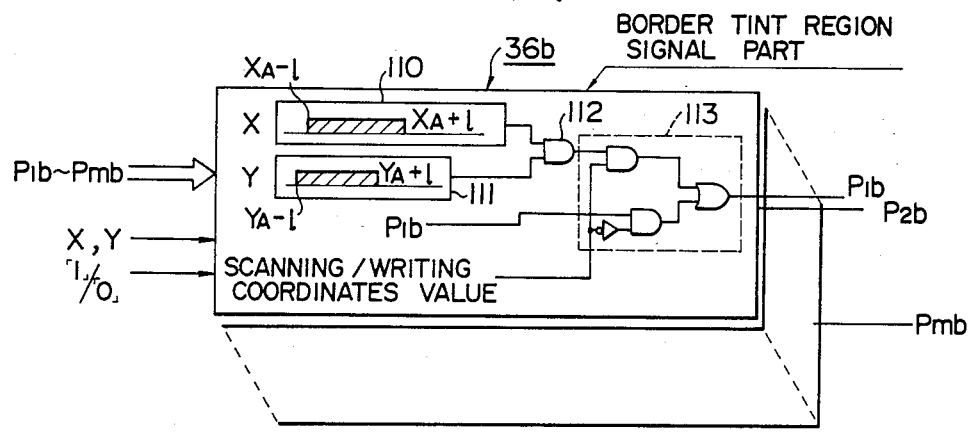
Figure 5:
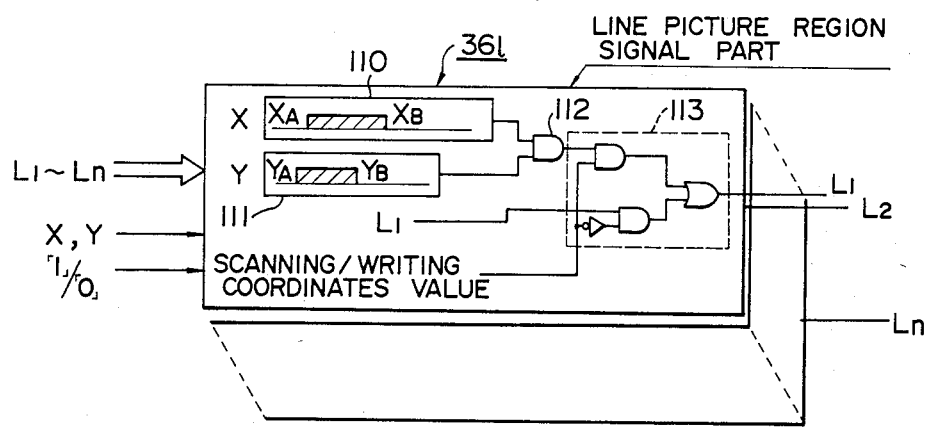

FIG. 3, FIG. 4 and FIG. 5 show respectively examples of the picture pattern region signal part 36p, border tint region signal part 36b and line picture region signal part 36l.

Each of the signal parts includes m or n pieces of circuits of the same type. Since these signal parts employ similar circuits, they will be described with reference to FIG. 3.

In one-dimensional memories 110,111, there are written the data "1"/"0" and coordinate values (X, Y), which are outputs from the AND gates 98-101 of the latch circuit 33 for coordinate values which designate regions, as well as data "1"/"0" from $X_A$ to $X_B$ (or from $X_{A-l}$ to $X_{B+l}$) and from $Y_A$ to $Y_B$ (or from $Y_{A-l}$ to $Y_{B+l}$) in accordance with the designation signals (either one of $P_{1i}$-$P_{mi}$, $P_{1b}$-$P_{mb}$ and $L_1$-$L_n$).

While coordinate values are written in, the designation signal (either one of $P_{1i}$-$P_{mi}$, $P_{1b}$-$P_{mb}$ and $L_1$-$L_n$) of the region-designating input switch 34 is turned to "1", which is output through the gate 113.

When scanning by the pick-up head, the one-dimensional memories 110, 111 for all the picture pattern region signal part 36p, border tint region signal part 36b and line picture region signal part 36 are read out in accordance with the coordinate values (X, Y) of scanning points. They are then converted to logical product outputs by the AND gate 112, and all the region signals ($P_{1i}$-$P_{mi}$, $P_{1b}$-$P_{mb}$ and $L_1$-$L_n$) are output.

When certain regions are overlapped, there are some region signals which take "1" simultaneously. By the subsequent circuits 38, 39 and 30, only one of such region signals is kept as "1" and the remaining region signals are changed to region signals "0".

Figure 6:
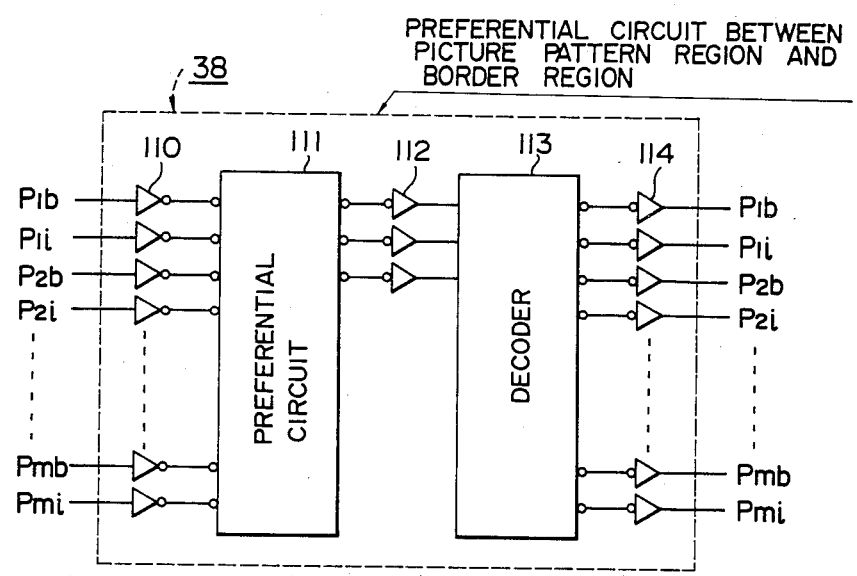
FIGS. 6 and 7 are block diagrams of preferential circuits for regions of the same type, according to different embodiments.
Figure 7:
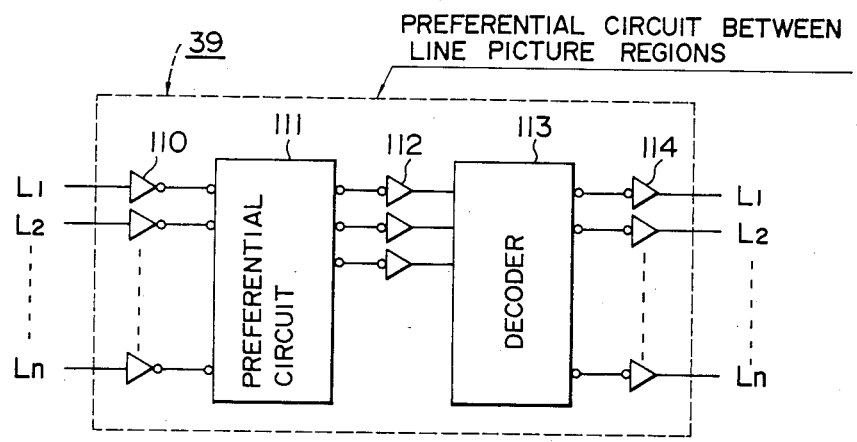

FIG. 6 and FIG. 7 illustrate respectively examples of the preferential circuit 38 between picture pattern region and border region and the preferential circuit 39 between line picture regions.

Since FIG. 6 and FIG. 7 show similar circuits, description will next be made with reference to FIG. 6.

NOT gate devices 110, 112, 114 have been added to obtain positive logic. Numeral 111 indicates a preferential encoder, which may for example be such a circuit as SN74LS148 fabricated by Texas Instruments Inc., U.S.A. Designated at numeral 113 is a decoder, which may for example be such a decoder as SN74LS138 fabricated by Texas Instruments Inc., U.S.A.

The numeral value of the input of the highest ranking out of the inputs (preferential ranking: $P_{mi} > P_{mb} > \ldots > P_{2i} > P_{2b} > P_{1i} > P_{1b}$) to the preferential encoder 111 is output in the BCD code from the referential encoder 111. From the decoder 113, "1" is output corresponding only to the input having the highest ranking of preference.

Figure 8A:
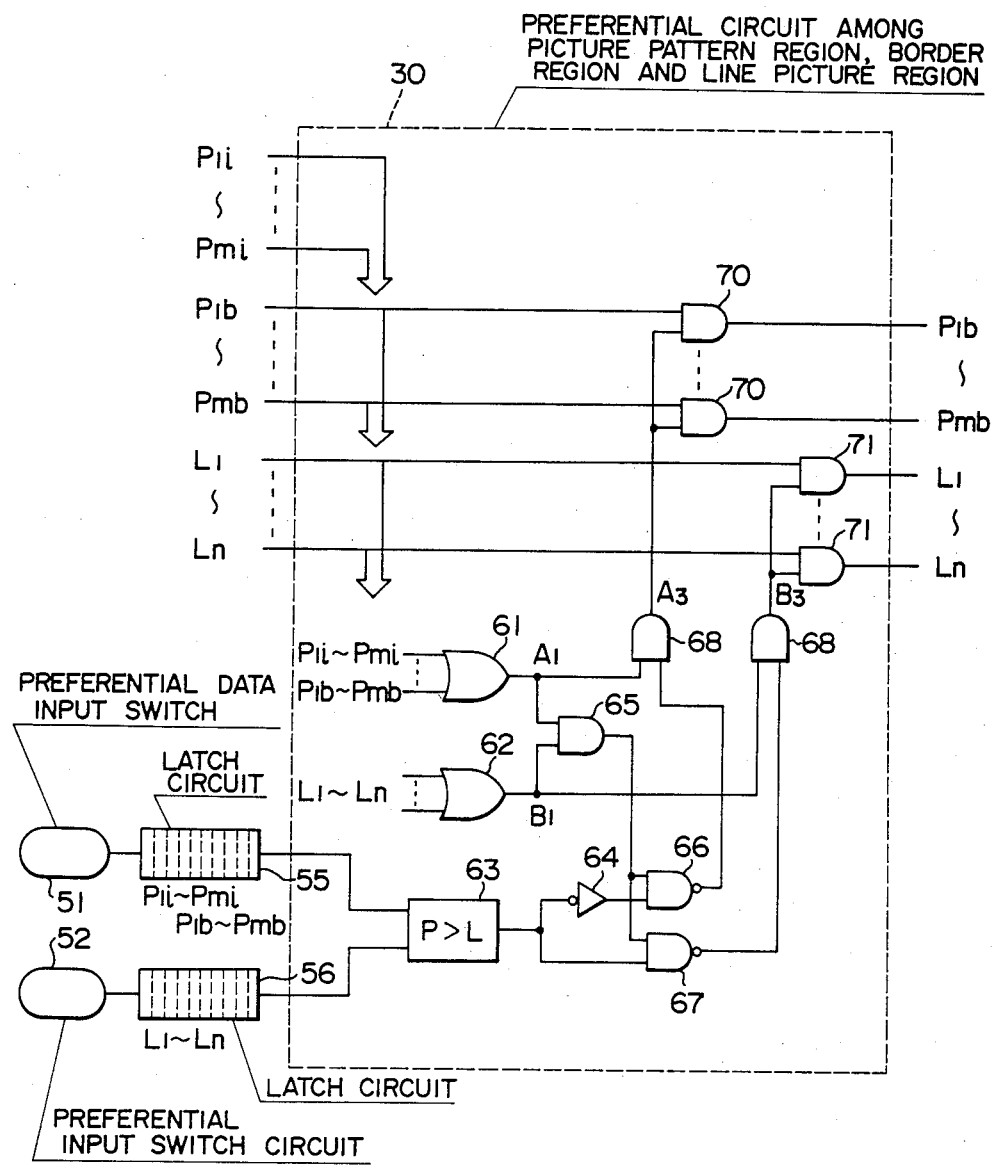
FIG. 8 is a block diagram of a preferential circuit for picture pattern regions, border regions and line picture regions.

FIG. 8 illustrates one example of the preferential circuit 30 among picture pattern region, border region and line picture region.

Inputs to an OR gate 61 are picture pattern and border region signals $(P_{1i}-P_{mi})(P_{1b}-P_{mb})$ and its output is designated by A1. On the other hand, inputs to an OR gate 62 are line picture region signals $(L_1-L_n)$ and its output is represented by B1.

When A1 and B1 are both "0", the outputs of AND gates 70, 71 are both "0". When A1 is "1" and B1 is "0", the output of an AND gate 65 becomes "0" while the outputs of NAND gates 66, 67 become "1" and the output of an AND gate 68 becomes "1". The gate of an AND gate 70 is therefore opened, thereby outputting one of the region signals $(P_{1b}-P_{mb})$ as "1".

When one of the region signals $(P_{1i}-P_{mi})$ is "1", all the signals $P_{1b}-P_{mb}$ and $L_1-L_n$ from the preferential circuit 30 output "0".

When the output A1 is "0" and the output B1 is "1", the output of the AND gate 69 becomes "1" in the above-mentioned manner. The AND gate 71 is thus opened, thereby outputting one of the region signals $(L_1-L_n)$ as "1" from the preferential circuit 30 among picture pattern region, border region and line picture region.

When at least one of the outputs A1 and B1 is "0", the NAND gates 66, 67 are both closed because the output of the AND gate 65 is "0". Hence, the output of the preferential circuit 30 among picture pattern region, border region and line picture region is not affected by the output of the comparator 63.

When picture pattern or border regions are overlapped with line picture regions in the course of a scanning operation, both of the outputs A1 and B1 become "1". Here, the preferential data output from the latch circuit 55 for preferential data on picture pattern and border regions are compared for example with the preferential data output from the latch circuit 56 for the preferential data on line picture regions at the comparator 63. If the preferential data on the picture pattern and border region is greater, the output from the comparator 63 becomes "1" and the output of the NAND gate 67 becomes "0". Correspondingly, the output of the AND gate 69 becomes "0", whereby to close the AND gate 71. Consequently, the region signals $(L_1-L_n)$ which are outputs from the preferential circuit 30 among picture pattern region, border region and line picture region are all turned to "0".

On the other hand, the output of the NOT circuit 64 becomes "0" while the output of the NAND gate 66 becomes "1". Thus, the AND gate 70 is opened by way of the AND gate 68. As a result, one of the region signals $(P_{1b}-P_{mb})$, which are outputs from the preferential circuit 30 among picture pattern region, border region and line picture region, is output. Here, it should be noted that the one of the region signals $(P_{1b}-P_{mb})$ corresponds to "1". In the case of picture pattern regions, "0" is output for each of the picture pattern regions from the preferential circuit 30 among picture pattern region, border region and line picture region. When the preferential data on the line picture regions are greater, the region signals $(P_{1b}-P_{mb})$ which are outputs from the preferential circuit 30 among picture pattern region, border region and line picture region are all turned to "0". Hence, the AND gate 71 is opened and one of the region signals $L_1-L_n$ is output as "1" from the preferential circuit 30 among picture pattern region, border region and line picture region.

Although the ranking of preference has been set by the preferential circuits 38, 39 among the line picture regions L3, L2, L1, picture pattern regions $P_{2i}, P_{1i}$ and border region $P_{2b}$ in FIG. 11, it is still necessary to set the ranking of preference at the data latch circuits 55, 56 with respect to the line picture regions L3, L2, L1, picture pattern regions $P_{2i}, P_{1i}$ and border region $P_{2b}$. If the ranking of preference is set up as $P_{1b}=1$, $L_1=2$, $L_{2b}=P_{2i}=3$, $L_3=4$ and $L_2=2$, recording will be performed in the same manner as in FIG. 12.

One example of the selector control circuit 25 is shown in FIG. 9. If outputs of the preferential circuit 30 among picture pattern region, border region and line picture region are picture pattern region signals, the region signals $(L_1-L_n, P_{1b}-P_{mb})$ are all "0" and in FIG. 9, the outputs of circuits 120, 00121 are both "0", the output A of the gate circuit 122 is "1" and the outputs B and C of the gate circuit 122 are both "0". When the outputs of the preferential circuit 30 among picture pattern region, border region and line picture region are border region signals, one of the region signals $(P_{1b}-P_{mb})$ becomes "1" and the output of the OR circuit 121 becomes "1". Correspondingly, the outputs A, B and C of the Gate circuit 122 become "0", "1" and "0" respectively. When the outputs of the preferential circuit 30 among picture pattern region, border region and line picture region are line picture region signals, one of the region signals $(L_1-L_n)$ becomes "1" and the output of the OR circuit 120 becomes "1". Therefore, the outputs A and B of the gate circuit 22 become both "0" while its output C becomes "1".

The signals A, B and C output from the selector control circuit 25 are input to the data selector 20.

One example of the character processing circuit 22 is illustrated in FIG. 10. When the outputs of the preferential circuit 30 among picture pattern region, border region and line picture region are line picture region signals (one of $L_1-L_n$ being "1"), the output of an OR circuit 130 becomes "1", which acts in association with the outputs from the binary coding circuit 21 and latch circuit 57.

When one of the registers $L_1-L_n$ of the latch circuit 57 is "1", the output of the binary coding circuit 21 is output, as is, through AND gates 131, 135 and OR gate 136. When the output of the latch circuit 57 for character processing data is "0", it closes the AND gate 135 and it is converted to "1" at a NOT circuit 133. Accordingly, an AND gate is opened. Thus, the output of the binary coding circuit 21 passes through the AND gate 131, is reversed at the NOT circuit 132, and is output via the AND gate 134 and OR gate 136.

Next, one specific example of performance of the picture processing will be described in detail on the basis of the exemplary original picture to be reproduced, which is shown in FIG. 11, and its output and reproduced picture depicted in FIG. 12.

First of all, the contents of the one-dimensional memories 110, 111 of the signal parts 36p, 36b, 36l and those of the registers of the data latch circuits 23, 24, 27, 55, 56, 57 are all set at "0".

Then, $L_3$ is selected by the region designation input switch 34 so as to input the coordinate values $(X_{B1}, Y_{B1})$ of the line picture region $L_3$ (see, FIG. 11) are input to the latch circuits (33) for coordinate values which designate regions. Based on the thus-input coordinate values $(X_{A1}, X_{B1}, Y_{A1}, Y_{B1})$, "1" is written in $X_{A1}$–$X_{B1}$ of the one-dimensional memory 110 of the part $L_3$ of the line picture region signal part 36l while "1" is written in $Y_{A1}$–$Y_{B1}$ of the one-dimensional memory 111.

To the register $L_3$ of the line picture tint data latch circuit 24, there are input tint data (i.e., a suitable value corresponding a figure between 0 and 100%) the tint input switch 29. On the other hand, to the register $L_3$ of the ON-OFF signal generator 27 for line picture beam, data of "1" (black character, black background) or "0" (white character, white background) are input by the switch 53. Furthermore, preferential data, for example, "4" is input by the switch 52 to the resister $L_3$ of the latch circuit 56 for preferential data on line picture regions. In addition, "1" (tint data placed in character background section) or "1" (tint data placed in character section) is input by the switch 54 to the register $L_3$ of the latch circuit 57 for character processing data.

Then, $P_{2i}$ is selected by the region designation input switch 34 for designation of regions. The coordinate values $(X_{A2}, Y_{B2})(X_{B2}, Y_{A2})$ of the picture pattern region $P_{2i}$ are input to the latch circuit 33 for region-designating coordinate values.

Based on the thus-input coordinate values $(X_{A2}, X_{B2}, Y_{A2}, Y_{B2})$, "1" is written in $X_{A2}$–$X_{B2}$ of the one-dimensional memory 110 of the $P_{2i}$ section of the picture pattern region signal part 36p and "1" is written in $Y_{A2}$–$Y_{B2}$ of the one-dimensional memory 111.

Thereafter, a preferential data, for example, "3" is input by the switch 51 to the register $P_{2i}$ of the latch circuit 55 for preferential data on picture pattern and border tint.

$P_{2b}$ is then selected by the region-designating input switch 24. As the coordinate values $(X_{A2}, X_{B2}, Y_{A2}, Y_{B2})$, the coordinate values of the picture pattern region $P_{2i}$ are used. The border width l is input by the border width input switch 7 so that as mentioned above, "1" is written in $X_{A2-l}$–$Y_{B2+l}$ of the one-dimensional memory of the $P_{2b}$ part of the border region signal part 36b and "1" is written in $Y_{A2-l}$–$Y_{B2-l}$ of the one-dimensional memory 111.

To the border tint data latch circuit 23, tint data (suitable values corresponding to 0–100%) are input via the tint input switch 29. A preferential data, for example, "3" is input by the switch 51 to the register $P_{2b}$ of the latch circuit 55 for preferential data on picture pattern and border regions.

The tint region $P_{1b}$ performs the designation of input of tint values by making the one-dimensional memories 110, 111 be "1" in their entirety. For reproducing and recording only the tint, it may for example be necessary to designate the coordinate values $(X_A, Y_A)(X_B, Y_B)$ in the tint region $P_{1b}$ and the border width at "0" (zero) without designating the picture pattern region $P_{1i}$. As preferential data, "1" may be taken in by way of example.

In this manner, the same procedure may also be performed with respect to the other regions $L_2$, $L_1$ and as preferential data, "2" and "2" may be respectively taken in by way of example.

When the scanning operation is next performed, the region signal $P_{1b}$ is output solely as "1" for a region composed of the tint region $P_{1b}$ only. Tint data is output from the register $P_{1b}$ of the border tint data latch circuit 23. The tint data is input through the input terminal B of the data selector 20 to the dot generator 26 and tint of a preset dot area percentage is recorded.

In an area where the tint region $P_{1b}$ and line picture region $L_2$ are overlapped, the region signal $P_{1b}$ and region signal $L_2$ are both "1", the preferential data output from the register $P_{1b}$ of the latch circuit 55 for preferential data on picture pattern, border and tint regions (hereinafter referred to as "the preferential data of the region $P_{1b}$") is "1" and the preferential data output from the register $L_2$ of the latch circuit 56 for preferential data on line picture regions (hereinafter referred to as "the preferential data of the region $L_2$") is "2". In the preferential circuit 30, the region signal $L_2$ is output "1". In the line picture region $L_2$, a line picture tint of an area percentage set in advance for the region signal $L_2$ is recorded as shown in FIG. 12.

In an area where the line picture region $L_3$, the picture pattern region $P_{2i}$ of the border region $P_{2b}$ and the tint region $P_{2i}$ are overlapped, the signal of each region becomes "1" and the picture pattern region $P_{2i}$ signal is output solely as "1" from the preferential circuit 38. The preferential data "4" of the region $L_3$ and the preferential data "3" of the region $P_{2i}$ are compared, and the line picture region $L_3$ signal is output solely as "1" from the preferential circuit 30.

In FIG. 11, the solid lines shown between the picture pattern region $P_{2i}$ and the border tint region $P_{2b}$ mean the frame of the picture pattern $P_{2i}$.

Figure 12:
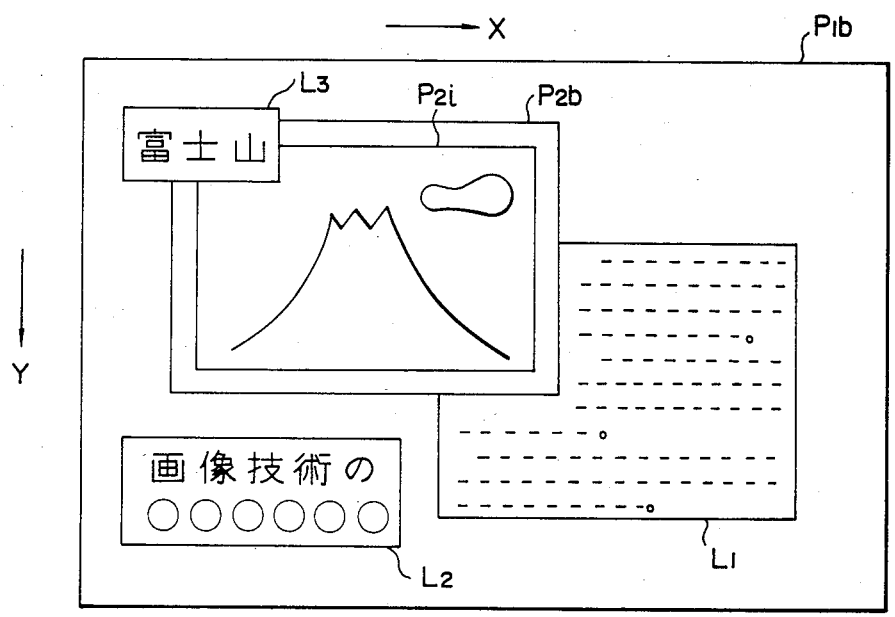
FIG. 12 shows one example of a reproduced picture.

By enclosing within the border tint region $P_{2b}$, the frame of the picture pattern $P_{2i}$ disappears as shown in FIG. 12 because the tint data of the register $P_{2b}$ of the border tint data latch circuit 23 is recorded.

Depending on the selection of each color plate, the region $L_2$ may for example be reproduced and recorded as a line picture of magenta color if in the ON-OFF signal generator 27 for line picture beam, "1" is input for the magenta plate and "0" is input for the yellow, cyan and black plates.

By changing the tint number from one color plate to another, the color of the tint part can be chosen in various ways. In this case, good work efficiency can be achieved when a circuit for four circuits is provided for the designation of regions.

This invention may also be applied to the method disclosed by the present applicant in Japanese Patent Publication No. 18601/1977, in which color plates of plural types are recorded in parallel in the course of a single scanning operation.

By the designation of region, either one of a picture pattern border region, tint region and line picture region is selected. In addition, the designation of region can be changed from one color plate to another. Thus, this invention has brought about such an advantageous effect that outputs can be obtained in various combinations (namely, a picture pattern region may be designated to another region).

In connection with line pictures, different regions may be designated to respective color plates. It is also possible to select white characters, solid characters or tint characters.

In the above description, the setting of the ranking of preference is effected by establishing the ranks respectively among the line picture regions and among the picture pattern border regions (i.e., by the preferential circuit 38 between picture pattern region and border region and the preferential circuit 39 between line picture regions). Preferential numbers may in advance be input respectively in the latch circuit 55 for preferential data on picture pattern regions and border regions and the latch circuit 56 for preferential data on line picture regions and the ranking of preference among individual regions may be determined in accordance with these preferential numbers.

As a further method, the ranking of preference may also be set as $P_{mi} > P_{mb} > L_m > \ldots P_{2i} > P_{2b} > L_2 > P_{1i} > P_{1b} > L_1$ for example provided the storage capacities of the region signal parts 36p, 36b, 36l are sufficient.

It may also be feasible to adopt, instead of the picture pattern region signal part 36p, border tint region signal part 36b and line picture signal part 36l, such a system that a plurality (m+m+n) of necessary parts are provided in the latch circuit 33 for region-designating coordinate values and the outputs of the AND gates 98, 99 or 100, 101 are sent as a logical product to the preferential circuits 38, 39.

For designating a rectangular region, the coordinate values of two diagonal vertexes may be input at either upper left vertex and lower right vertex or upper right vertex and lower left vertex. When only one corner is seen due to overlapping, it may be possible to estimate the corresponding vertex at a suitable point in the overlapped area and to input the coordinate value of the vertex.

When all the four vertexes are not seen due to overlapping, it is possible to input either one of the coordinate values (either one of $X_A$, $X_B$, $Y_A$ and $Y_B$) and to set the remaining three coordinate values at suitable points in the overlapped area.

In addition to the above-described advantageous effects of this invention, the following further advantageous effects can also be brought about in the present invention:

(1) It is possible to produce tint only at a line picture region by reversing the polarity of each line picture signal at the character processing circuit 22 in accordance with an output from the character processing data latch circuit 57. If the line picture signal only for the region $L_3$ is by way of example reversed in FIG. 12, tint set at the region $L_3$ can be output to a line picture region.

(2) By the ON-OFF signal generator 27 for line picture beam, it is possible to selectively output a line picture output, for instance, a line picture output such as that corresponding to the line picture region L3 in FIG. 12 to a specific region, for example, to a desired color-separated plate. Thus, line picture outputs of desired colors can be produced irrespective to the original picture.

(3) Since the classification of regions is effected electronically by designating coordinate points, it is possible to obtain an advantageous effect that frame shade lines by the thickness of the original picture do not occur if the classification of the regions is designated inside the frame of the original picture of a line picture and the original picture of a picture pattern.

As has been understood from the above description, the present invention allows to separate and input an original layout picture of a complex arrangement and picture structure in a simple operation, whereby to obtain very flexible output results. It is thus possible to perform in a short period of time a process which required very complex steps and lots of man power in conventional methods.

Having now fully described the invention, it will be apparent to one of ordinary skill in the art that many changes and modifications can be made thereto without departing from the spirit or scope of this invention as set forth herein.

We claim:

1. A picture scanning and recording method including photoelectrically scanning an original picture, which contains picture patterns of continuous tone in combination with line pictures such as characters or graphics, providing two types of image-detecting photoelectric means in order to record reproduced halftone images for the picture patterns and reproduced line picture images of high resolution for the line pictures respectively, and outputting two types of picture signals to the recording side, which comprises:

designating in advance, in the original picture, picture pattern regions to be reproduced as the halftone images, line picture regions to be reproduced as the line picture images and border regions surrounding the respective picture pattern regions respectively with the coordinate values of representative points in the respective regions; setting in advance line picture tint data and border tint data, which are required to record desired tint patterns corresponding respectively to the line picture regions and border regions, for the line picture regions and border regions respectively; upon photoelectrically scanning the original picture, selecting picture signals corresponding to the scanned regions on the basis of the coordinate values of each scanning point and the coordinate values of the representative points in the respective regions, and outputting the thus-selected picture signals to the recording side; and at the same time, at an area where two or more of the designated picture regions are overlapped, selecting picture signals having higher preference on the basis of a preset order of preference.

2. A picture scanning and recording method according to claim 1, wherein each of the regions is defined by a rectangle having sides parallel to the scanning direction and the two diagonal vertexes of the rectangle are selected as the representative points for the region.

3. A picture scanning and recording method according to claim 1, wherein with respect to the line picture regions, plural types of line picture tint pattern data are set to record plural types of tint patterns, whereby to record different tint patterns at least between the line sections and the background sections.

4. A picture scanning and recording method according to claim 3, wherein the different tint patterns are different in either one or both of the percentages of the dot areas thereof and the dot pitches thereof.

5. A picture scanning and recording method according to claim 1, wherein plural types of border tint data are set to record plural types of tint patterns, whereby to record different tint patterns respectively for border regions corresponding to different picture pattern regions or for plural sections obtained by dividing one of the border regions.

6. A picture scanning and recording method according to claim 5, wherein the different tint patterns are different in either one or both of the percentages of the dot areas thereof and the dot pitches thereof.

7. A picture scanning and recording method according to claim 1, wherein region numbers are given to the respective designated regions and upon scanning the original picture, the picture signal to be recorded corresponding to each scanned region is selected on the basis of the region number of the scanned region.

8. A picture scanning and recording method according to claim 7, wherein the preference of the region numbers are ranked on the basis of a designated layout so as to select picture signals to be recorded with priority at an area where plural regions are overlapped.

* * * * *